(12) United States Patent
Pullini et al.

(10) Patent No.: US 10,994,523 B2
(45) Date of Patent: May 4, 2021

(54) METHOD FOR OBTAINING A JOINT BETWEEN ELEMENTS OF DIFFERENT MATERIALS

(71) Applicant: C.R.F. Società Consortile per Azioni, Orbassano (IT)

(72) Inventors: Daniele Pullini, Orbassano (IT); Massimo Cucco, Orbassano (IT); Gabriele Ciaccio, Orbassano (IT); Fabio D'Aiuto, Orbassano (IT); Michele Maria Tedesco, Orbassano (IT)

(73) Assignee: C.R.F. SOCIETA CONSORTILE PER AZIONI, Orbassano (IT)

( * ) Notice: Subject to any disclaimer, the term of this patent is extended or adjusted under 35 U.S.C. 154(b) by 131 days.

(21) Appl. No.: 16/510,264

(22) Filed: Jul. 12, 2019

(65) Prior Publication Data

US 2020/0147948 A1    May 14, 2020

(30) Foreign Application Priority Data

Nov. 9, 2018    (EP) .................................. 18205489

(51) Int. Cl.
*B32B 37/02*        (2006.01)
*B33Y 10/00*       (2015.01)
(Continued)

(52) U.S. Cl.
CPC ............ *B32B 37/02* (2013.01); *B23K 26/362* (2013.01); *B29C 64/153* (2017.08); *B32B 3/30* (2013.01);
(Continued)

(58) Field of Classification Search
CPC .......... B29C 66/7212; B29C 66/74283; B29C 66/7394; B29C 65/1629; B29C 2791/009; B29C 70/845; B29C 69/00; B29C 66/7392; B29C 66/863; B29C 64/153; B29C 66/3032; B29C 66/742; B29C 66/0246; B29C 66/83221; B29C 66/038; B29C 65/524; B29C 66/1122; B29C 66/43; B29C 66/721; B32B 3/30; B32B 37/02; B32B 38/0036; B32B 2250/03; B32B 7/12; B32B 15/08; B32B 15/18; B32B 37/06;
(Continued)

(56) References Cited

U.S. PATENT DOCUMENTS

2015/0021379 A1 *  1/2015  Albrecht .................. B05B 7/22
                                                    228/256
2017/0095971 A1 *  4/2017  Pullini ............... B29C 65/1629

FOREIGN PATENT DOCUMENTS

EP      3153303 A1    12/2017
JP      2011143539 A1  7/2011
WO      2009031632 A1 12/2009

OTHER PUBLICATIONS

European Search Report and Written Opinion for European Patent Application No. 18205489.0-1014 dated Apr. 26, 2019.

* cited by examiner

*Primary Examiner* — Vishal I Patel
(74) *Attorney, Agent, or Firm* — Heslin Rothenberg Farley & Mesiti P.C.; Victor A. Cardona, Esq.

(57) ABSTRACT

A joint between at least one element of metal material and at least one element of plastic material is obtained by pressing these elements in contact against each other, with a simultaneous application of heat. A cladding of metal material and/or of plastic material is applied above the joint by additive manufacturing technology.

8 Claims, 4 Drawing Sheets

Figure 1:
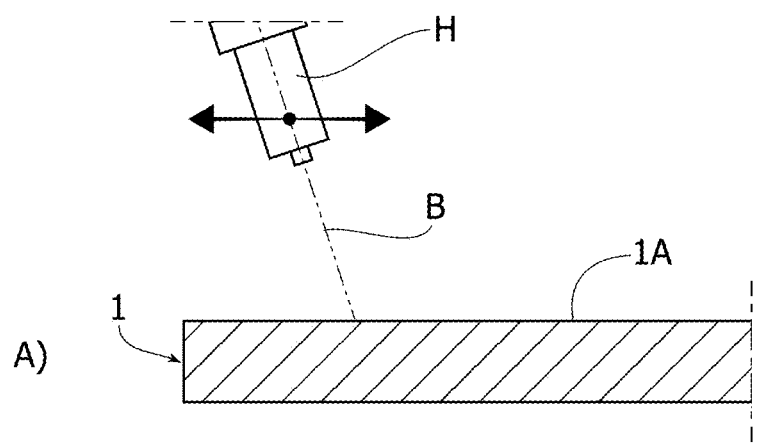

(51) Int. Cl.
*B29C 64/153* (2017.01)
*B23K 26/362* (2014.01)
*B32B 3/30* (2006.01)
*B32B 7/12* (2006.01)
*B32B 15/08* (2006.01)
*B32B 15/18* (2006.01)
*B32B 37/06* (2006.01)
*B32B 37/12* (2006.01)
*B32B 38/00* (2006.01)

(52) U.S. Cl.
CPC ................ *B32B 7/12* (2013.01); *B32B 15/08* (2013.01); *B32B 15/18* (2013.01); *B32B 37/06* (2013.01); *B32B 37/12* (2013.01); *B32B 38/0008* (2013.01); *B32B 38/0036* (2013.01); *B33Y 10/00* (2014.12); *B32B 2250/03* (2013.01)

(58) Field of Classification Search
CPC ..... B32B 37/12; B32B 38/0008; Y02P 10/25; B33Y 10/00; B62D 29/005; B22F 3/1055; B23K 26/362; B29L 2031/3002; B29K 2307/04
See application file for complete search history.

METHOD FOR OBTAINING A JOINT BETWEEN ELEMENTS OF DIFFERENT MATERIALS

CROSS REFERENCE TO RELATED APPLICATIONS

This application claims priority from European Patent Application No. 18205489.0 filed on Nov. 9, 2018, the entire disclosure of which is incorporated herein by reference.

FIELD OF THE INVENTION

The present invention relates to a method for obtaining a joint between elements of different materials.

PRIOR ART

Methods have been already proposed in the past for providing a joint between elements of different materials, of the type in which the joint comprises at least one element of metal material and at least one element of plastic material having respective contact surfaces which are pressed against each other, with a simultaneous application of heat, the heat being obtained for example with the aid of a laser beam. Methods of this type are also known in which the surface of the metal element which is to come in contact with the element of plastic material has at least one uneven surface portion, with a distribution of asperities. Following the above mentioned application of heat a softening and in some cases even a local melting of the plastic material is generated, so that the latter fills the spaces between the asperities of the uneven surface portion of the metal element and maintains this configuration after a subsequent cooling. In this manner, a joint is obtained having high strength characteristics.

Methods of the above indicated type are for example disclosed in WO 2009/031632 A1 and JP 2011 143539 A1.

As an alternative, or in addition, to the forming of an uneven surface portion on the contact surface of the metal element, also the application of a layer of adhesive in the joint can be provided.

Whatever is the selected method, the joint obtained thereby has good strength characteristics.

However, a need is felt to improve the above mentioned methods, in order to obtain joints between elements of metal material and elements of plastic material which have a higher degree of strength and which in particular can be used as structural components, for example in particular in motor-vehicle structures.

It is also to be noted that in European patent application EP 17208803, still secret at the filing date of the present application, the Applicant has already proposed the application of the technology of additive manufacturing to a metal structure, in particular to a welded joint between metal elements.

OBJECT OF THE INVENTION

The main object of the present invention is that of providing a joint between at least one element of metal material and at least one element of plastic material which is characterized by a higher strength with respect to the joints of this type which could be obtained with the known methods.

A further object of the invention is that of fulfilling the above indicated purpose with a simple and inexpensive process.

Also an object of the invention is that of providing a method for joining elements of different materials which can be easily adapted to motor-vehicle production lines of today and which accordingly does not involve high costs for being implemented.

A further object is that of providing a joint between elements of different materials which has a high-strength, whilst also having a relatively reduced weight.

SUMMARY OF THE INVENTION

In view of achieving these and further objects, the invention provides a method for obtaining a joint between elements of different materials, in which the joint comprises at least one element of metal material and at least one element of plastic material having respective contact surfaces, wherein said contact surfaces of said at least one element of metal material and said at least one element of plastic material are pressed against each other with a simultaneous application of heat, said method being characterized in that it further comprises the step of applying a cladding of metal material and/or plastic material above said joint, by means of additive manufacturing technology.

In the present description and in the following claims, the term "additive manufacturing" is used to mean a method in which an energy source is used, such as a laser or plasma beam, to selectively melt layers of powders or wires of the metal material or plastic material, of various sizes, so as to form, layer above layer, a "cladding" of metal material or plastic material above a component. The cladding of the invention can also be multi-level and include both a coarse base cladding (thickness in the order of millimeters) as well as a fine cladding (thickness in the order of 100 microns) and/or a super-fine cladding (thickness in the order of tenths of micron or even less).

In the preferred embodiment, therefore, the method of the invention is further characterized in that the above indicated step of applying a cladding by additive manufacturing technology comprises both a step of applying a cladding made by powders and/or wire of metal material, and a step of applying a cladding made by powders and/or wire of plastic material.

Furthermore, as indicated, in one embodiment the above mentioned step of applying a cladding by additive manufacturing technology can comprise a first step of applying a coarse base cladding and a second step of applying a fine cladding, including a distribution of strengthening micro-ribs, above the base cladding.

According to a further feature, the method can further comprise a step of local quenching obtained by feeding a cold fluid above the cladding layer, immediately after the application of the cladding. This operation can be carried out in order to provide an increase of the mechanical characteristics of a metal cladding.

In a further embodiment, the method can comprise a local heating step, obtained by feeding a hot fluid, immediately before or after the step of application of the cladding. This heating step has the function of causing a release of the inner stresses induced within the material during the process.

According to a further feature, the method of the invention can be characterized in that before joining the metal element and the element of plastic material with each other, on the contact surface of the metal element an uneven surface portion is formed by a laser, this portion having a distribution of asperities, the application of heat being such that a softening of the plastic material is generated so that said plastic material fills the spaces between the asperities of said uneven surface portion and maintains this configuration after a subsequent cooling.

As an alternative or in addition to this last feature, the method can be characterized in that before joining the metal element and the element of plastic material with each other, on the contact surface of the metal element a layer of adhesive is applied. The use of the adhesively layer is particularly indicated in case the plastic material is a thermosetting plastic material.

In one embodiment, before joining the metal element and the element of plastic material with each other, on the contact surface of the metal element the above mentioned uneven surface portion is formed by laser, this surface portion having a distribution of asperities, and further in that before said joining, above said contact surface having said uneven surface portion a layer of adhesive is applied, which fills the spaces between the asperities of the uneven surface portion.

The cladding obtained by additive manufacturing technology can comprise portions of plastic material and/or portions of metal material. In one embodiment, the cladding has a single portion of metal material or plastic material which is superimposed to both the above mentioned elements of plastic material and elements of metal material constituting the joint. Alternatively, the cladding can have separate portions of metal material and plastic material which are superimposed on the element of metal material and on the element of plastic material, respectively.

According to a further preferred feature, the above mentioned method includes the step of providing an operating head including both a nozzle for dispensing powders or wire of metal material or plastic material, and a laser head for focusing a laser beam, as well as a nozzle for feeding a hot or cold fluid, for locally heating or cooling the cladding.

DETAILED DESCRIPTION OF PREFERRED EMBODIMENTS

Figure 2:
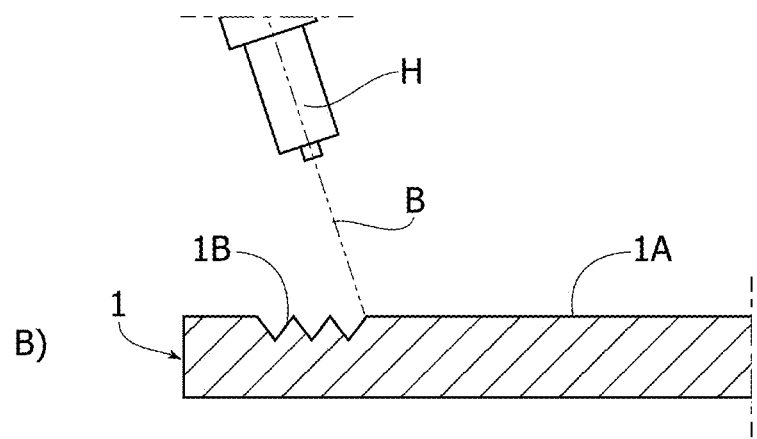
Figure 3:
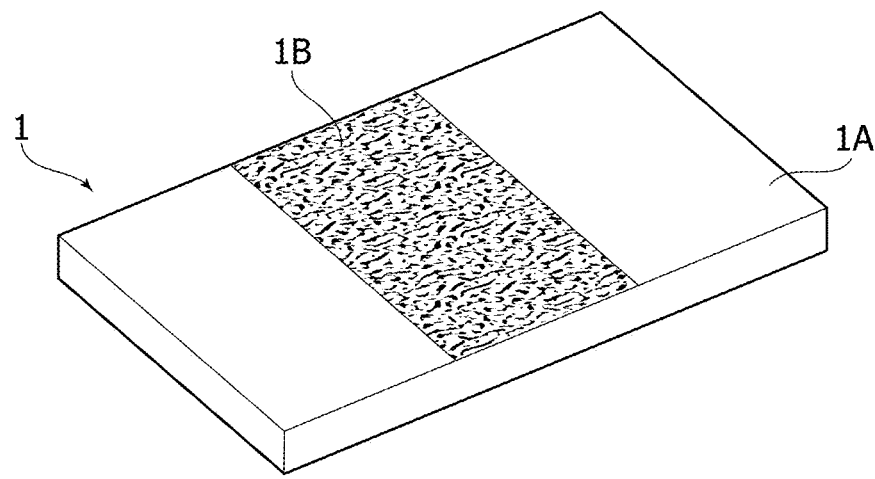
Figure 5:
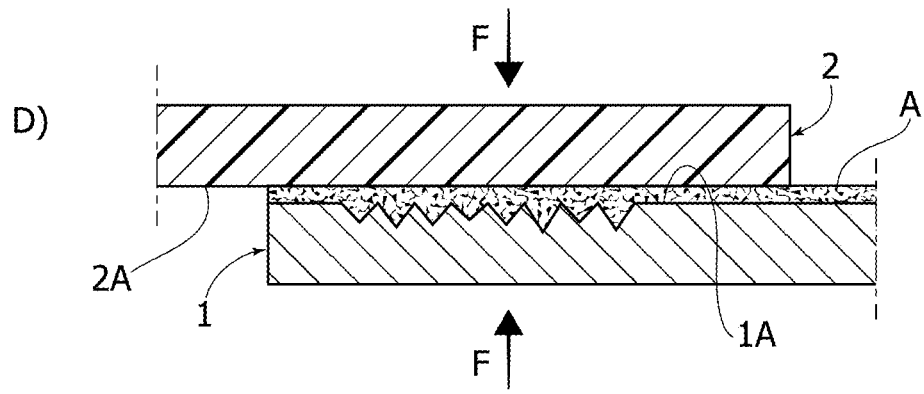
Figure 6:
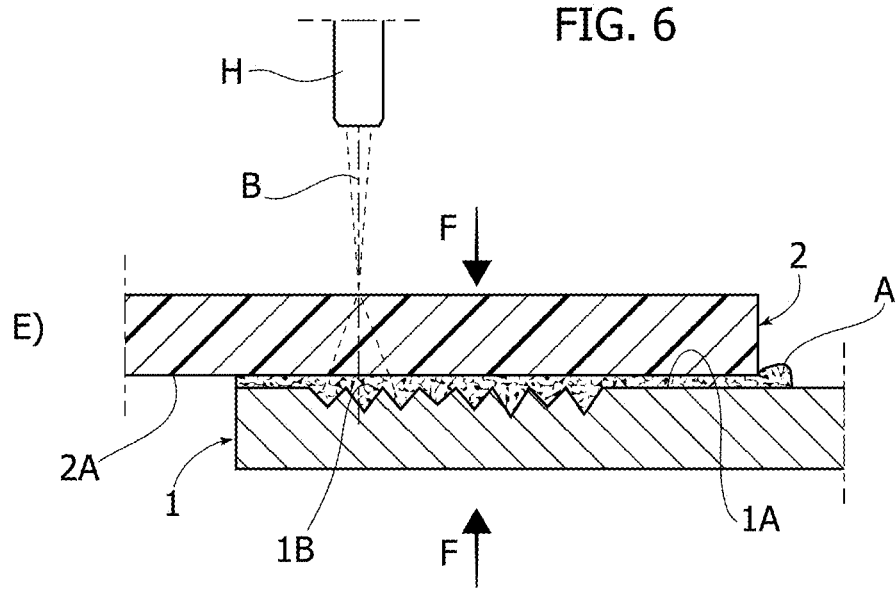
Figure 7:
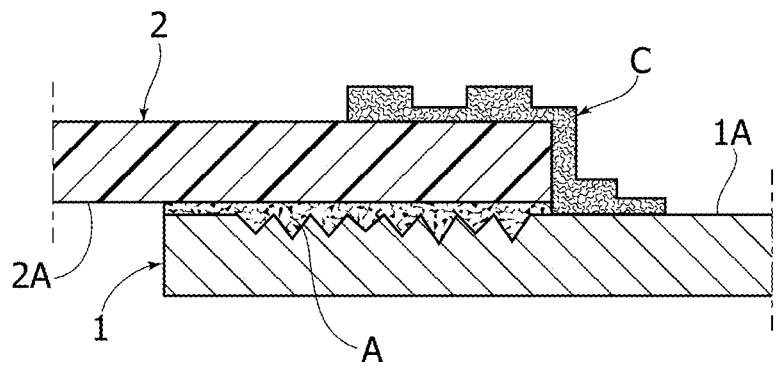
Figure 8:
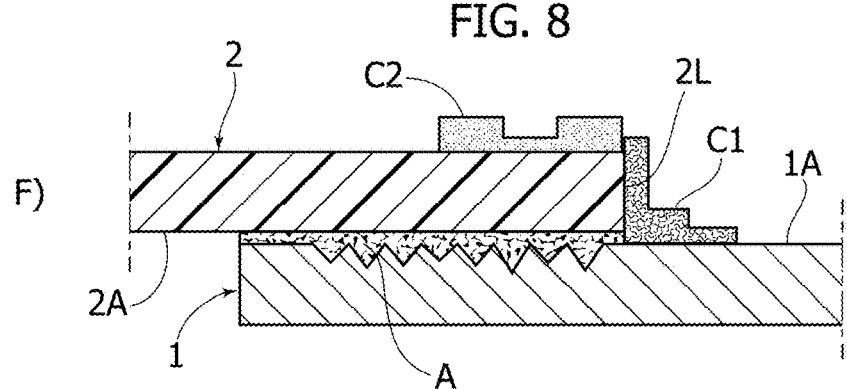
Figure 9:
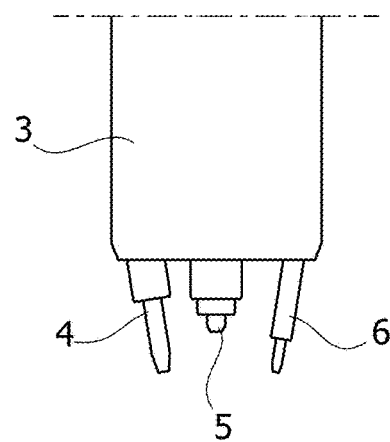
Figure 10:
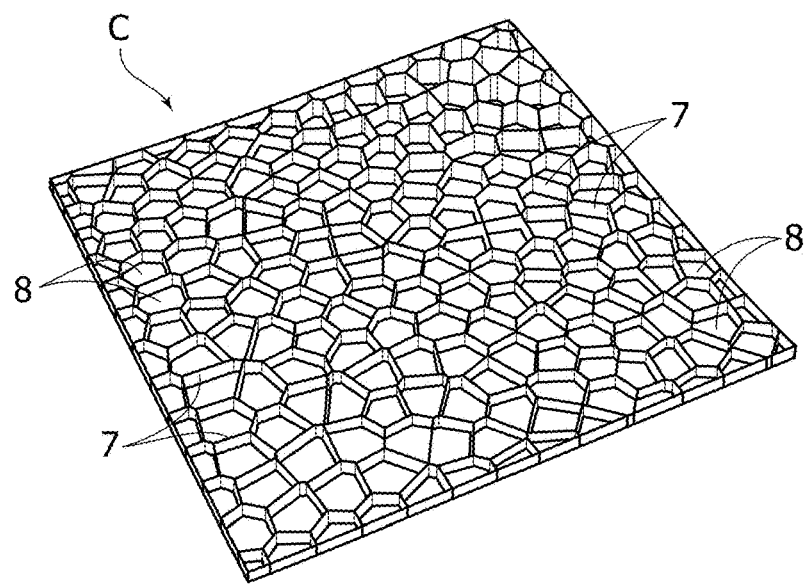

Further features and advantages of the invention will become apparent from the description which follows with reference to the annexed drawings, given purely by way of non-limiting example, in which:

FIGS. 1, 2, 4, 5, 6, 7 show subsequent steps of one embodiment of the method according to the invention, FIG. 3 is a perspective view of an element of metal material after the method step which is shown in FIG. 2, FIG. 8 shows a variant of FIG. 7, FIG. 9 is a diagrammatic view of an operating unit which can be used in implementing the method according to the invention, and FIG. 10 is a perspective view of one example of an upper cladding layer which is formed with micro-ribs.

In the example shown in the drawings, the method of the invention includes a preliminary step in which a panel 1 of metal material, for example of steel, is subjected to a heating operation by means of a laser beam B emitted from a laser focusing head H which is displaced (for example by means of a robot) above, and at a distance from, the panel 1, so as to move the focusing spot of the laser beam P along a surface 1A of the panel.

In the illustrated example, the method comprises a subsequent step in which on the surface 1A of the metal panel 1 an uneven surface portion 1B is formed, having a distribution of asperities. The uneven surface portion 1B can be for example a knurled surface, as shown in FIG. 3. In the case of the example of FIG. 2, the knurled surface 1B is obtained by means of a laser beam B projected against the surface 1A by a laser head H, which is moved above, and spaced apart from, surface 1A, for example with the aid of a robot. However, the uneven surface portion 1B could be obtained by any other suitable technique, for example by sand-blasting or by an etching operation.

Figure 4:
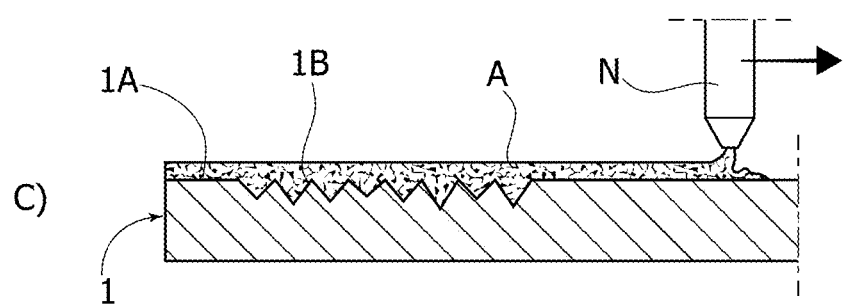

In the example illustrated herein, the method according to the invention includes a following step, shown in FIG. 4, in which above the surface 1A there is applied a layer of adhesive 1A, for example by means of a nozzle N for dispensing adhesive material, moved by means of a robot. The use of the adhesive material is required in the case in which the element of plastic material which is to be joined to the panel of sheet metal 1 is constituted by a thermosetting plastic material, whereas the use of adhesive can be useful, but can also be avoided if the plastic material of the panel which is to be joined to the panel of the sheet metal 1 is a thermoplastic material.

FIG. 5 shows the following step of the method according to the invention, in which a panel of plastic material 2 is superimposed and pressed (by any suitable means of known type, not illustrated herein for greater clarity of the drawings). In particular, surface 2A of the panel of plastic material 2 which faces towards the panel 1 of metal material is pressed against surface 1A of the panel of metal material 1, with the interposition of the layer of adhesive A.

FIG. 6 shows that, while the two panels 2 are still pressed against each other by forces F, the joint between the two panels is subjected to heating with the aid of a laser beam B focused by a laser head H, for example carried by a robot. This step involves a local softening of the plastic material constituting the panel 2 in case this plastic material is a thermoplastic material. Also in this case, the layer of adhesive A, as already indicated above, can be omitted, so that the softened thermoplastic material penetrates into the cavities between the asperities of the uneven surface portion 1B, and then hardens within the above mentioned cavities.

According to a basic feature of the invention, above the joint of the two panels 1, 2 there is applied a cladding C, by additive manufacturing technology.

FIG. 9 of the annexed drawings diagrammatically shows a head 3 for additive manufacturing, comprising a first dispensing nozzle 4, located at one end of a conduit (not shown) for supplying powders or wire of metal material or plastic material. The head 3 further comprises a laser head 5 for focusing a laser beam in the area of the position of the powders or wire of metal material or plastic material. Finally, in the embodiment illustrated herein, the head for additive manufacturing 3 also comprises a nozzle 6 for dispensing a cold or hot fluid, in order to cool or heat the area of the position of the cladding, right before or after the application of the cladding, as it will be described more in detail in the following.

In the example illustrated in FIG. 7, the cladding C is applied so as to be superimposed both to the panel of metal material 1, and to the panel of plastic material 2, in the area of the joint. The result is a joint having improved strength characteristics, with no relevant increase in weight.

In a preferred embodiment, the step of applying a cladding by additive manufacturing technology can comprise a first step of applying a coarse base cladding (thickness in the order of millimeters) and a second step of applying a fine cladding (thickness in the order of 100 microns) and/or a super-fine cladding (thickness in the order of tenths of micron or even less). The fine cladding superimposed to the base cladding preferably includes a distribution of micro-ribs having a strengthening function, above the base cladding, for example according to the configuration shown in FIG. 10, which includes a plurality of ribs 7 in the form of leafs orthogonal to the substructure so as to define a plurality of closed cells 8.

FIG. 8 shows a variant of FIG. 7, in which a cladding of plastic material C1 is applied above the panel of plastic material 2, and a cladding of metal material C1 is applied above the panel of metal material 1. The cladding C1 adheres both to the surface 1A of the metal panel 1, and to the lateral edge 2L of the panel of plastic material 2.

In one embodiment of the method according to the invention, a local quenching step is provided, which is obtained by feeding a cold fluid (for example through nozzle 6 visible in FIG. 9) above the cladding layer, immediately after the step of applying the cladding. In this manner, an increase of the mechanical characteristics of the joint is obtained.

Also according to the invention, a local heating step can be provided, obtained by feeding a hot fluid (for example by means of the same nozzle 6 shown in FIG. 9) immediately before or after the step of applying the cladding, in order to release inner stresses induced in the material.

Studies and tests conducted by the Applicant have shown that the method according to the invention dramatically improves the mechanical characteristics of the joint between an element of metal material and an element of plastic material, without involving at the same time any relevant increase in weight.

Naturally, the invention is also applicable to a joint which includes more than one element of metal material or more than one element of plastic material.

As also indicated, the element of plastic material can be constituted by thermoplastic material or thermosetting material, or also by a composite material including a synthetic matrix reinforced with fibers, such as carbon fibers.

The method according to the invention is also adapted to be easily implemented in assembling processes of motor-vehicle bodies, wherever there is the need of the obtaining joints between metal elements and elements of plastic material for components which must have also a structural function.

Naturally, while the principle of the invention remains the same, the details of construction and the embodiments may widely vary with respect to what has been described and illustrated purely by way of example, without departing from the scope of the present invention.

What is claimed is:

1. Method for obtaining a joint between elements of different materials in which the joint comprises at least one element of metal material and at least one element of plastic material, having respective contact surfaces, the method comprising:
    pressing said contact surfaces of said at least one element of metal material and said at least one element of plastic material against each other with a simultaneous application of heat, and
    applying a cladding of metal material and/or plastic material above said joint, by additive manufacturing technology.

2. Method according to claim 1, wherein the applying the cladding by additive manufacturing technology comprises a step of applying a cladding made with powders and/or wire of metal material and/or a step of applying a cladding made with powders and/or wire of plastic material.

3. Method according to claim 1, wherein the applying the cladding by additive manufacturing technology comprises a first step of applying a coarse base cladding and a second step of applying a fine cladding, including a distribution of strengthening micro-ribs above the base cladding.

4. Method according to claim 1, further comprising obtaining a local quenching step obtained by feeding a cold fluid above the cladding layer immediately after the step of applying the cladding.

5. Method according to claim 1, further comprising feeding a hot fluid immediately before or after the step of applying the cladding for local heating.

6. Method according to claim 1, wherein before joining the metal element and the element of plastic material with each other, further comprising forming on the contact surface of the metal element, with the aid of a laser, an uneven surface portion, having a distribution of asperities, the application of heat being such as to generate a softening of the plastic material, so that said material fills the spaces between the asperities of said uneven surface portion and keeps this configuration after a subsequent cooling.

7. Method according to claim 1, further comprising applying a layer of adhesive before the joining between the metal element and the element of plastic material on the contact surface of the metal element.

8. Method according to claim 1, wherein before joining the metal element and the element of plastic material with each other on the contact surface of the metal element, forming an uneven surface portion having a distribution of asperities, and applying a layer of adhesive before said joining above said contact surface having said uneven surface portion, the layer of adhesive filling the spaces between the asperities of said uneven surface portion.

* * * * *